Oct. 23, 1962 M. J. BERLYN 3,059,423
EXHAUST EJECTOR
Filed Nov. 15, 1961
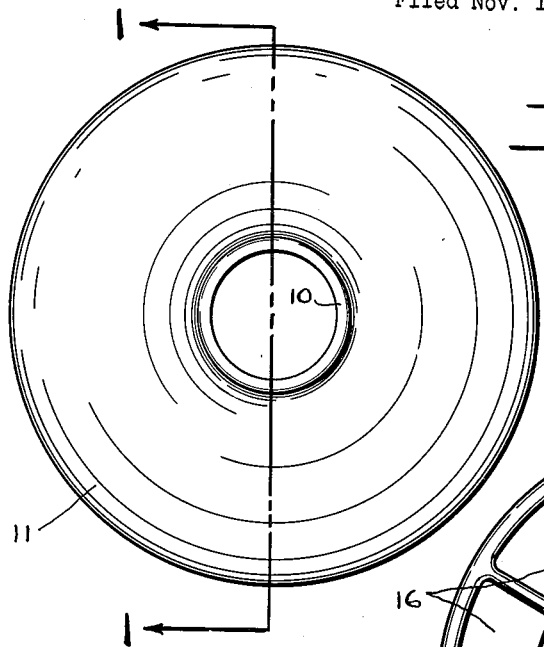
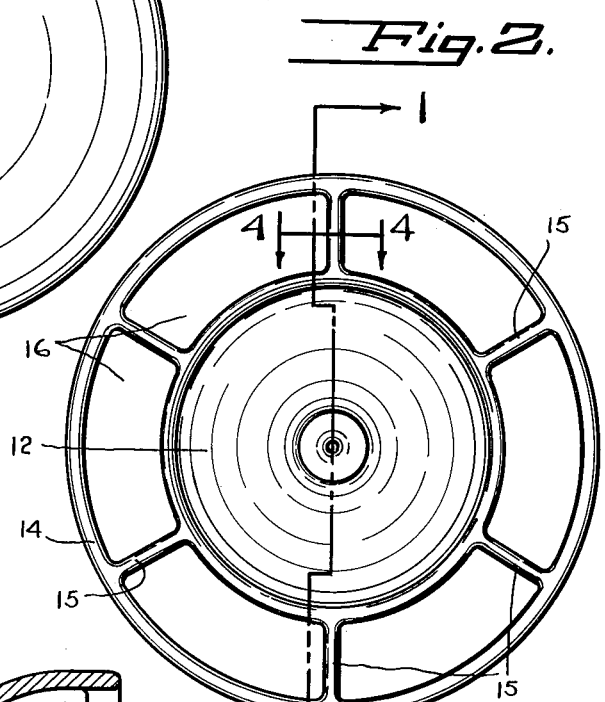
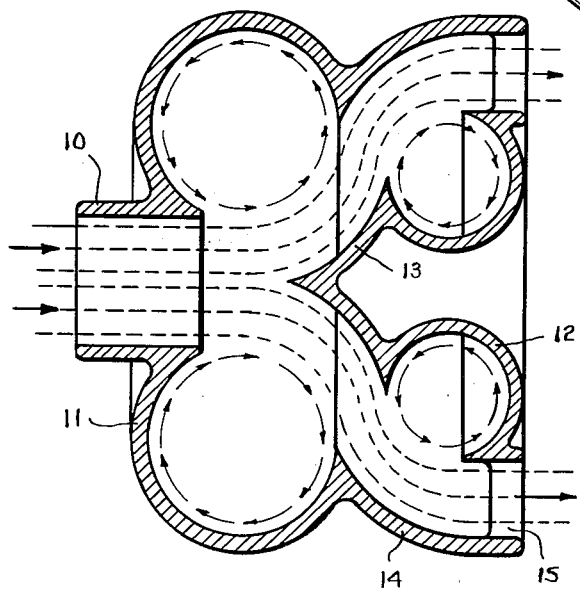
INVENTOR.
MARTIN J. BERLYN
BY
Raymond A. Paquin
ATTORNEY

United States Patent Office 3,059,423
Patented Oct. 23, 1962

3,059,423
EXHAUST EJECTOR
Martin J. Berlyn, 389 Metcalfe Ave., Montreal 6, Quebec, Canada
Filed Nov. 15, 1961, Ser. No. 152,488
5 Claims. (Cl. 60—32)

This invention relates to exhaust systems for internal combustion engines.

Exhaust back-pressure reduces the power available from four-stroke-cycle internal combustion engines by increasing the pumping losses.

Attempts to overcome back-pressure by the use of "tuned," or resonant, exhaust systems have been effective only in a restricted band of the speed range; the back-pressure has been somewhat increased outside of this band.

Achievement of sub-atmospheric pressure in the exhaust tract, by recovery of the velocity energy of the gas before releasing it to atmosphere, has been attempted by means of static diffusers; but gas velocity fluctuations due to the impulsive discharge characteristic of internal combustion engines, limit the effectiveness of a diffuser.

Combination of a diffuser with a tuned exhaust system is common in racing engines. It works well where the range of engine speed is narrow but, even in racing, a broader effective speed range would be an advantage.

A known device for reducing fluctuation of the gas velocity consists of a free windmill in, and coaxial with, the exhaust pipe. High-velocity gas impulses store energy in the windmill by imparting angular acceleration to it; the windmill then delivers its stored kinetic energy, acting as a fan, by imparting linear acceleration to the low-velocity gas between impulses. The windmill functions as a reservoir of velocity-energy; consequently, the fluctuations of gas velocity in its wake are less than the upstream fluctuations. Though effective when working, the environment of the device, inside the exhaust pipe, is unfavourable to maintenance of bearing temperatures at a level tolerable to lubricating oil. Reliability of this device, and its life expectancy, have not proved acceptable.

I have invented a simple and compact device, having no moving parts, for reduction of exhaust back pressure in the exhaust systems of four-stroke-cycle internal combustion engines. This device functions as a reservoir of velocity energy and as a laminar flow diffuser.

The exhaust ejector according to this invention stores velocity energy of exhaust gas impulses in two captive toroidal vortices, then employs this energy to accelerate the lagging gas column between impulses. The two toroidal vortices also provide boundary layer control for deceleration of the exhaust gas without energy loss due to turbulence; furthermore, they make possible a large diffusion ratio in an unusually short axial length.

Referring to the drawings:

FIG. 1 is a section on 1—1 of FIGS. 2 and 3;
FIG. 2 is an axial elevation of the discharge end;
FIG. 3 is an axial elevation of the inlet end; and
FIG. 4 is a section on 4—4 of FIG. 2.

With reference to the figures wherein similar reference characters designate corresponding parts throughout the several views, and more particularly FIG. 1, the preferred form of my ejector as shown is of one-piece construction. 10 is the inlet duct (of circular cross-section, see FIG. 3), 11 is the major toroidal chamber, 12 is the minor toroidal chamber, 13 is the concave spreader cone, 14 is the concave deflector bell, 15 are radial spokes forming the structural connection of spreader cone 13 and minor toroidal chamber 12 to deflector bell 15; 16 are the discharge ports.

Exhaust gas entering by way of inlet duct 10 drives a vortex which spins in major toroidal chamber 11, as indicated by arrows in FIG. 1. This vortex will be referred to hereinafter as the major vortex. Since this vortex is toroidal, its axis is a closed circle; therefore, there is no access to the core of the vortex whereby gas can "feed" into its zone of low pressure; hence the vortex cannot grow and, since it does not grow, it cannot escape from toroidal chamber 11 but must remain permanently captive.

The stream of gas, having passed through the eye of the major vortex, splits over spreader cone 13 and is accelerated over the concave surface so that there is no separation, which is to say that laminar flow is preserved over the surface of spreader cone 13.

The outside of the split stream of gas, however, is "on the inside of the turn" after passing the eye of the major vortex. Such flow configuration is conducive to separation and turbulence; but in this invention there is no boundary layer to initiate turbulence because the gas stream is passing over a rolling toroidal vortex whose surface velocity is substantially the same as that of the gas stream itself; thus, laminar flow is preserved in the gas stream throughout its contact with the spreader cone and the major vortex.

The outside of the gas stream, as it leaves the major vortex, reaches the concave surface of the collector bell. As this surface imparts acceleration to the gas, laminar flow is preserved.

The inside of the gas stream, on the other hand, having left the surface of spreader cone 13, is "on the inside of the turn." This layer of gas, however, flows over the rolling surface of a vortex in minor toroidal chamber 12, hereinafter referred to as the minor vortex. Here, again, the surface velocity of the vortex so nearly matches the velocity of the inside layer of the gas stream that there is no boundary layer, and laminar flow does not break down.

The energy stored in the two vortices by peak gas velocity is spent in accelerating the gas stream between velocity peaks, whereby the fluctuation of velocity at the discharge is less than the fluctuation of velocity at the inlet.

Should the exhaust contain solid particles such as soot in suspension, there is no tendency for these to accumulate in the toroidal vortex chambers because there is no feeding of the vortices once they are established. Furthermore, since the vortex surfaces in contact with the main stream of gas are "on the inside of the turn," solid particles are centrifugally flung away from the vortex chambers and into the main stream of gas, to be discharged to atmosphere.

The operation of the device is believed apparent from the foregoing description.

From the foregoing it will be seen that I have provided new and improved means for obtaining all of the objects and advantages of my invention. It will be understood that only the preferred form of my invention has been shown and described by way of illustration.

I claim:

1. In an exhaust ejector for an internal combustion engine, captive toroidal vortex means, a casing having an inlet and a first toroidal vortex coaxial with said inlet, a spreader coaxial with said inlet on the side of said first toroidal vortex remote from said inlet, a second toroidal vortex coaxial with said inlet and on the side of said spreader remote from said first toroidal vortex and a collector housing concentric with said second toroidal vortex and on the side of said first toroidal vortex remote from said inlet.

2. In an exhaust ejector for an internal combustion engine, captive toroidal chamber means, a casing having an inlet and a first toroidal chamber coaxial with said inlet, a spreader coaxial with said inlet on the side of said first toroidal chamber remote from said inlet, a second toroidal chamber coaxial with said inlet and on the side of said spreader remote from said first toroidal chamber and a collector housing concentric with said second toroidal chamber and on the side of said first toroidal chamber remote from said inlet.

3. In an exhaust ejector for an internal combustion engine, captive toroidal vortex means, a casing having an inlet and a major toroidal vortex coaxial with said inlet, a spreader coaxial with said inlet on the side of said major toroidal vortex remote from said inlet, a minor toroidal vortex coaxial with said inlet and on the side of said spreader remote from said major toridal vortex and a collector housing concentric with said minor toroidal vortex and on the side of said major toroidal vortex remote from said inlet.

4. In an exhaust ejector for an internal combustion engine, captive toroidal chamber means, a casing having an inlet and a major toroidal chamber coaxial with said inlet, a spreader coaxial with said inlet on the side of said major toroidal chamber remote from said inlet, a minor toroidal chamber coaxial with said inlet and on the side of said spreader remote from said major toriodal chamber and a collector housing concentric with said minor toroidal chamber and on the side of said major toroidal chamber remote from said inlet.

5. In an exhaust ejector for an internal combustion engine, a pair of captive toroidal vortex chambers, a casing having an inlet with one of said toroidal chambers coaxial with said inlet, a spreader coaxial with said inlet on the side of said toroidal chamber remote from said inlet, a second toroidal chamber coaxial with said inlet and on the side of said spreader remote from said first toroidal chamber and a collector housing concentric with said second toroidal chamber and on the side of said first toroidal chamber remote from said inlet.

No references cited.